United States Patent
Kelly et al.

(10) Patent No.: US 7,853,666 B2
(45) Date of Patent: Dec. 14, 2010

(54) DATA RETRIEVAL FROM COMPUTING SYSTEMS

(75) Inventors: Michael R. Kelly, Omaha, NE (US); Bruce A. Calvert, Murphy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 11/036,080

(22) Filed: Jan. 13, 2005

(65) Prior Publication Data

US 2006/0168100 A1    Jul. 27, 2006

(51) Int. Cl.
*G06F 15/16* (2006.01)

(52) U.S. Cl. .............. 709/217; 709/231; 455/432.1; 455/432.2; 455/432.3; 455/433

(58) Field of Classification Search ......... 709/217–219, 709/248, 230; 455/432.1–433
See application file for complete search history.

(56) References Cited

U.S. PATENT DOCUMENTS

| | | | |
|---|---|---|---|
| 5,787,433 A | 7/1998 | Plotkin et al. | |
| 6,182,212 B1 | 1/2001 | Atkins et al. | |
| 6,370,646 B1 | 4/2002 | Goodman et al. | |
| 6,453,174 B1 * | 9/2002 | Cunningham et al. | 455/560 |
| 6,584,312 B1 * | 6/2003 | Morin et al. | 455/433 |
| 6,636,961 B1 | 10/2003 | Braun et al. | |
| 6,662,010 B1 * | 12/2003 | Tseitlin et al. | 455/426.1 |
| 2001/0034677 A1 | 10/2001 | Farhat et al. | |
| 2002/0013850 A1 | 1/2002 | Mitchell et al. | |
| 2002/0045436 A1 * | 4/2002 | Ekanayake et al. | 455/406 |
| 2002/0169883 A1 * | 11/2002 | Bright et al. | 709/230 |
| 2003/0130980 A1 | 7/2003 | Bell et al. | |
| 2003/0225927 A1 | 12/2003 | Goodman et al. | |

FOREIGN PATENT DOCUMENTS

CA    2295289    7/2000

* cited by examiner

*Primary Examiner*—Shawki S Ismail (57) ABSTRACT

A computing device embodiment includes a processor, memory coupled to the processor, and computer executable instructions executable by the processor. Computer executable instructions are provided to the memory and executable by the processor to access a first provider's communications computing device, having a user's information thereon, through a data lookup utility used by the first carrier. The computer executable instructions can also retrieve the user's information from the first provider's communications computing device and transfer the retrieved information to a second provider's communications computing device.

30 Claims, 4 Drawing Sheets

DATA RETRIEVAL FROM COMPUTING SYSTEMS

INTRODUCTION

Communications systems, such as systems used in telecommunications networks, include a number of system components. These system components work together to relay information from one wired or wireless communications device, such as a telephone, laptop or desktop computing device, or personal digital assistant (PDA), to another.

In making a connection between two or more communications devices, standards have been established for the format of data used for the set up of the connection, billing of one or more of the device users, tear down of the connection, transfer of the connection from one system component to another, etc. In this way, each component within the communications system, and in some cases, other systems, can interact to accomplish the connection of the call and associated functions.

Typically, however, each provider of a communications system component designs their system differently with respect to where data is stored, how the data is organized, and/or what format the data is in when stored. The information regarding where the data is stored, how the data is organized, and/or what format the data is in when stored is typically viewed by the provider as proprietary information. In this way, it can be difficult for another provider to be able to access a communications system component and identify particular data stored therein.

For example, in order to provide connection of communications devices and other associated functions, the various communications system components operate using an operating system from the particular provider of communications system components to a communications carrier. The operating system can allow the components of the communications systems to provide the functions of the communications system in a manner that is generally transparent to the user.

The software that different providers use to operate their system components can be different from that of other providers. For example, the software can be different in the functions the software provides, in how the functions are provided, and in how the data that is used to provide the functions is formatted and stored.

In such cases, if a carrier wants to switch from one provider to another, the change can be difficult. For instance, the data from the first provider is generally not organized such that it can be located, used, retrieved, and/or transferred to the other provider's computing device(s). For example, data used for a particular function can be organized in multiple tables. The tables are not organized together, but the operating system used by the provider includes computer executable instructions that can find the information as if it had been organized together. In this way, the other provider may have to recreate the data on their system, rather than being able to transfer the data from the first provider's system components.

DETAILED DESCRIPTION

Embodiments of the present disclosure provide devices, systems, and methods for data retrieval. Embodiments can give providers the ability to retrieve data from another provider's computing device. In various embodiments, this is accomplished through use of a data lookup utility that is provided by a first provider (i.e., the provider of the computing device on which the data to be received is located) to a communications carrier (i.e., the entity that provides the communications service between communications devices).

Through use of this utility, the information from the first provider's computing device can be retrieved and transferred to a second provider's computing device for use with the second provider's operating system without respect to the proprietary storage, format, and/or an understanding of the linkage of data within multiple locations. In this way, the transition from one provider's components to another provider's components can be accomplished more easily, since the data can be extracted using the first provider's own data lookup utility. Additionally, in some embodiments, components from different communications system component providers can share data within a communications system.

A Communications System

Embodiments of the present disclosure include various communications system embodiments. Communications systems can be of various types and can be found in many fields of technology. An example of one type of communications system is provided in FIG. 1A which illustrates a communications system 100 for use in the telecommunications industry.

In the telecommunications industry, communications systems can include, but are not limited to, wireline systems, like a Publicly Switched Telephone Network (PSTN), and wireless systems, like Global System for Mobile communications (GSM) networks, American National Standards Institute (ANSI) networks, Universal Mobile Telecommunication System (UMTS) networks, and Enhanced Data for Global Evolution (EDGE) networks, Public Wireless Local Area Networks (PWLAN), Internet Protocol (IP), general packet radio service (GPRS), Code Division Multiple Access (CDMA and Wireless CDMA) and 802.11 networks, to name a few. The communications devices using such systems can include fixed or mobile devices and can have several communications systems through which a communications session can take place. Although the systems shown herein are generally utilized as mobile telecommunications networks, the embodiments are not limited to the structures shown.

Figure 1A:
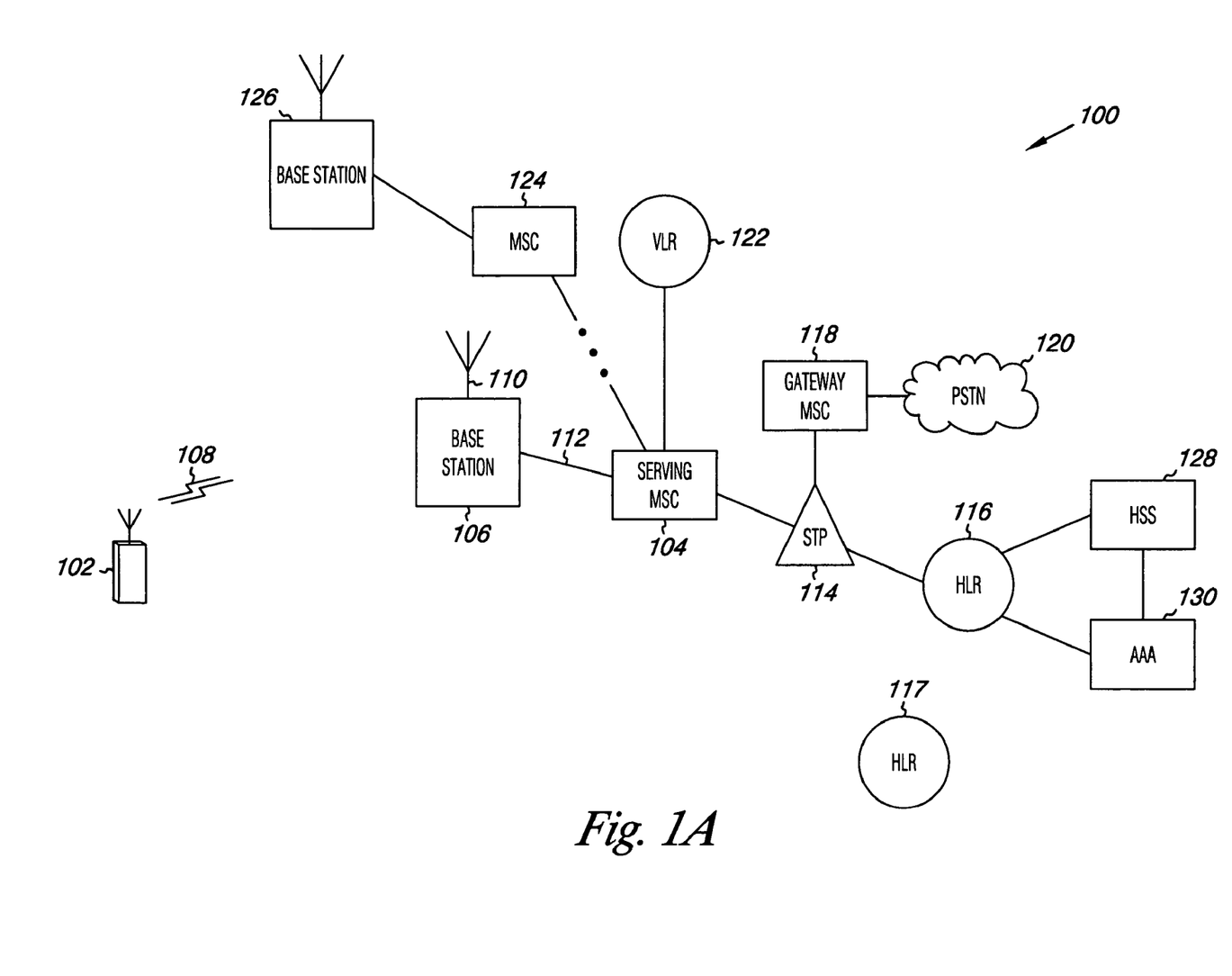
FIG. 1A illustrates an example of a communications system.

The communications system example, provided in FIG. 1A, includes a number of base stations 106 and 126, a number of mobile switching centers (MSCs) 104, 118, and 124, a signal transfer point (STP) 114, a visiting location register (VLR) 122, a home subscriber/user server (HSS) 128, an authorization, authentication, and accounting (AAA) component 130, and a first provider's home location register (HLR) 116. From an operational standpoint, FIG. 1A illustrates a mobile communications device 102 communicating with a MSC 104 through a base station 106 and an antenna 110.

FIG. 1A provides an example of the types of components used in a communications system and discusses the various services provided between components in order to facilitate a connection for the communication of information. The embodiment of FIG. 1A is also provided for reference as to a telecommunications system environment which can benefit from embodiments of the present disclosure. However, the embodiments of the disclosure relate to various types of communications systems and, accordingly, may not be limited to the example shown in FIG. 1A or to telecommunications systems generally.

A request for a connection with a communications device can be received from various sources, such as from another device within the communications system or a device from another communications system, such as from the PSTN 120 or from the Internet, for example. A communications device can be used to receive and transmit information to and/or from a user.

When a request is received, from a communications device, by the communications system, it is provided to an MSC for routing. This receiving MSC is sometimes referred to as the gateway MSC (GMSC). The MSC that is used to route the call and make the connection between the two communications devices is often referred to as the serving MSC (SMSC). In some cases, the GMSC can also act as the SMSC.

Additionally, as shown in FIG. 1A, whenever the mobile device 102 roams into a new MSC coverage area (i.e., the "cell" for which the MSC is responsible) the new MSC becomes the SMSC. The mobile device transmits its stored identity to the new SMSC via a base station 106. In the embodiment of FIG. 1A, the user identity information is transmitted over a radio channel 108 and detected by an antenna 110 of base station 106. Base station 106, in turn, transmits the user identity information to the SMSC 104, such as for example, via communication line 112.

Signal transfer point 114 is a node in a communications system that routes messages between exchanges, and between exchanges and databases that hold user and routing information. A HLR is one such database in a cellular system that contains the user information within the provider's home service area. The data in the HLR can be requested and transferred to a VLR in the new area.

Other components of the system can include voice switches, such as service switching points (SSPs), that can query service control point (SCP) databases using packet switches, and other databases such as, billing components, security components, data servers, and the like.

The communications system 100 shown in FIG. 1A also includes a HSS 128 and an AAA component 130. The HSS 128 manages information about the mobile user, similar to a HLR, but expands its management services to include additional information such as location information which can be used to develop location-based services. As its name implies, the AAA 130 is used to monitor access to the communication system by checking a user's authorization, authenticating the user's identification, and initiating the billing of the user for the connection.

As one will appreciate from reading the present disclosure, the above described communications system components (e.g., MSCs, HLRs, and/or VLRs, AAAs, among others) are functionalities that reside on computing devices. These functionalities are provided by computer executable instructions to perform the tasks of each particular function.

The MSCs, HLRs, VLRs, and the like, are often placed on separate computing device components of a communications system, however, the embodiments of the present disclosure are not so limited. For example, in some systems, the HLR, the HSS, and/or the AAA can be combined and can be provided on the same computing device. Additionally, some systems have separate billing servers for handling some or all of the accounting functions of the AAA.

In various embodiments, a communications system can include a first provider's communications computing device (e.g., communications system component) having a number of first provider communications applications and data thereon. In some embodiments, the data can include a user's information. The information can be of various types such as user attributes, including but not limited to, user profile information and/or communications device information. Examples of such information include; a user identifier, a communications device identifier, a communications device manufacturer identifier, a communications device model identifier, a server roaming list, a user name, user's residential/mailing/billing address, phone number, e-mail address, a credit card number, and/or a credit card expiration date, to name a few.

The system can also include a second provider's communications computing device that gains access to the first provider's communications computing device through a data lookup utility used by a first provider to retrieve the user's information from the first provider's communications computing device. The retrieved information can be transferred to the second provider's communications computing device.

Figure 1B:
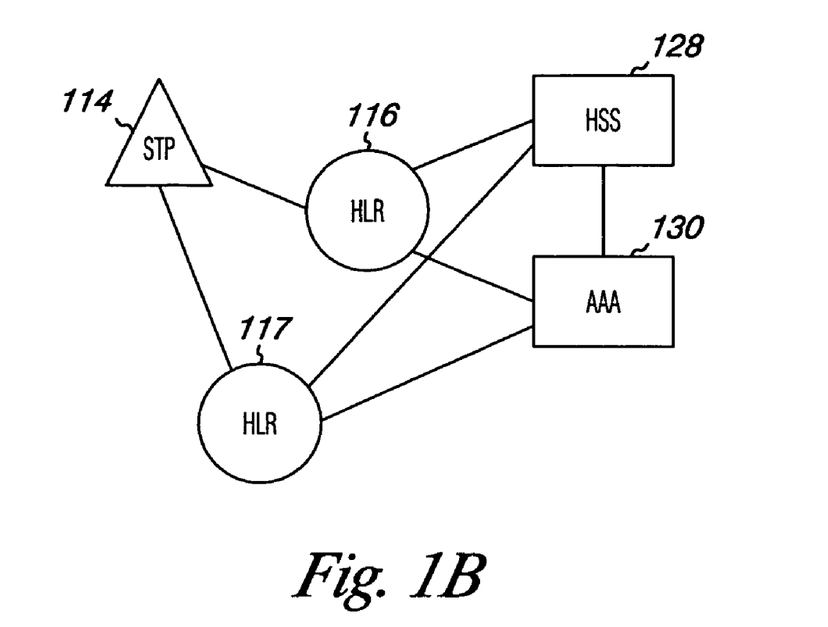
FIG. 1B illustrates an example of the replacement of a component of the system of FIG. 1A.

Embodiments of the present disclosure can include communications components from a number of providers. For example, a communications system can have communications system components from first and second providers, as is shown in FIG. 1B. In such embodiments, the received information can be used to aid the communications system components in communicating with each other and to communications devices being connected through the system. Computer executable instructions can be used, for example, to translate information between the components of the different providers and/or update information on the second provider's component, in order for the components by different providers to work together.

Figure 1C:
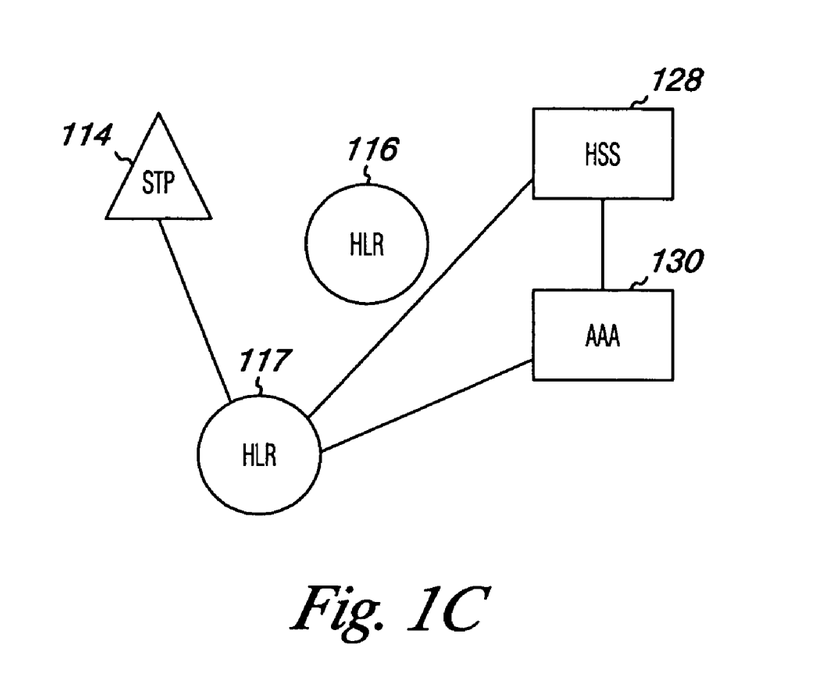
FIG. 1C illustrates another example of the replacement of a component of the system of FIG. 1A.

Embodiments of the present disclosure can also be used to replace one or more components of a communications system, such as the components of the telecommunications system shown in FIG. 1A. For example, in FIG. 1A, a first provider's communications computing device (e.g., a HLR 116 in the illustrated case) is shown, connected to the communications system 100. A second provider's communications computing device 117 is also shown in FIG. 1A. The communications computing device 116 can be replaced in the communications system 100 with communications computing device 117, as shown in FIG. 1C. FIGS. 1A-1C, when viewed in sequence, illustrate one way in which the replacement can be accomplished.

FIG. 1B illustrates an example of a number of system components including HLRs of a first and a second provider. In FIG. 1B, the communications computing device 116 is connected to the STP 114, the HSS 128, and the AAA 130, as was the case in FIG. 1A. Additionally, the communications computing device 117 has also been connected with the STP 114, HSS 128, and AAA 130. In this way, the communications computing device 117 can be setup to perform various functions within the communications system 100 without having to remove the communications computing device 116 before the communications computing device 117 is ready to take over for the communications computing device 116.

Since interaction between communications system components has been standardized in many fields of technology, the information about a user and/or a communications device can, in some instances, be retrieved from these communications between the system. These communications are typically in a user readable format or other standardized format and can therefore more easily be used to retrieve user and/or device information, than data stored in a proprietary format.

In this way, data can be retrieved, from the communications computing device 116 or elsewhere on the communications system 100, for use on the communications computing device 117. Once received, the information can be used to update the information within communications computing device 117 in order to ready the communications computing device 117 to take over for the communications computing device 116. The updating can be accomplished automatically, through use of computer executable instructions, or manually once the information is retrieved. Examples of the data structures of the communications computing device 116 and communications computing device 117 are provided below and discussed with respect to FIGS. 3A and 3B.

FIG. 1C illustrates another example of a number of system components including HLRs of a first and a second provider. FIG. 1C illustrates that once communications computing device 117 has been updated with the information retrieved from communications computing device 116 and/or elsewhere on the communications system 100, the communications computing device 116 can be removed from the communications system 100.

For example, the connections between the communications computing device 116 and the STP 114, the HSS 128, and the AAA 130 have been removed, while the connections with the communications computing device 117 are left in place. The removal of these connections can be accomplished through use of computer executable instructions and/or by altering the computer executable instructions that provide the routing and/or connection to such components.

In this manner, the communications computing device 117, as shown in FIG. 1C, has replaced the communications computing device 116 within the communications system 100. In some embodiments, the replacement can be accomplished such that the users and/or the carrier are not aware that a change has been made.

Communications Computing Devices of First and Second Providers

In some embodiments, a computing device for use in a communications system includes a processor and memory coupled to the processor. Computer executable instructions are provided to the memory and executable by the processor to access a first provider's communications computing device, having a user's information thereon, through a data lookup utility used by the first provider. The computer executable instructions also retrieve the user's information from the first provider's communications computing device and transfer the retrieved information to a second provider's communications computing device.

The first provider's data lookup utility can, for example, be a data extraction utility or a provisioning stream. A data extraction utility can be used to copy and/or move data from one computing device to another. A provisioning stream can be used to provide data to a computing device for purposes of setting the device up for operation within the system. Provisioning streams can also be used to set up a user on a communications system, by placing the user's information within the memory of the communications system.

The first provider's communications computing device can also include a home location register for maintaining a list of home system users. The computing device for use in a communications system is the second provider's communications computing device.

Figure 2:
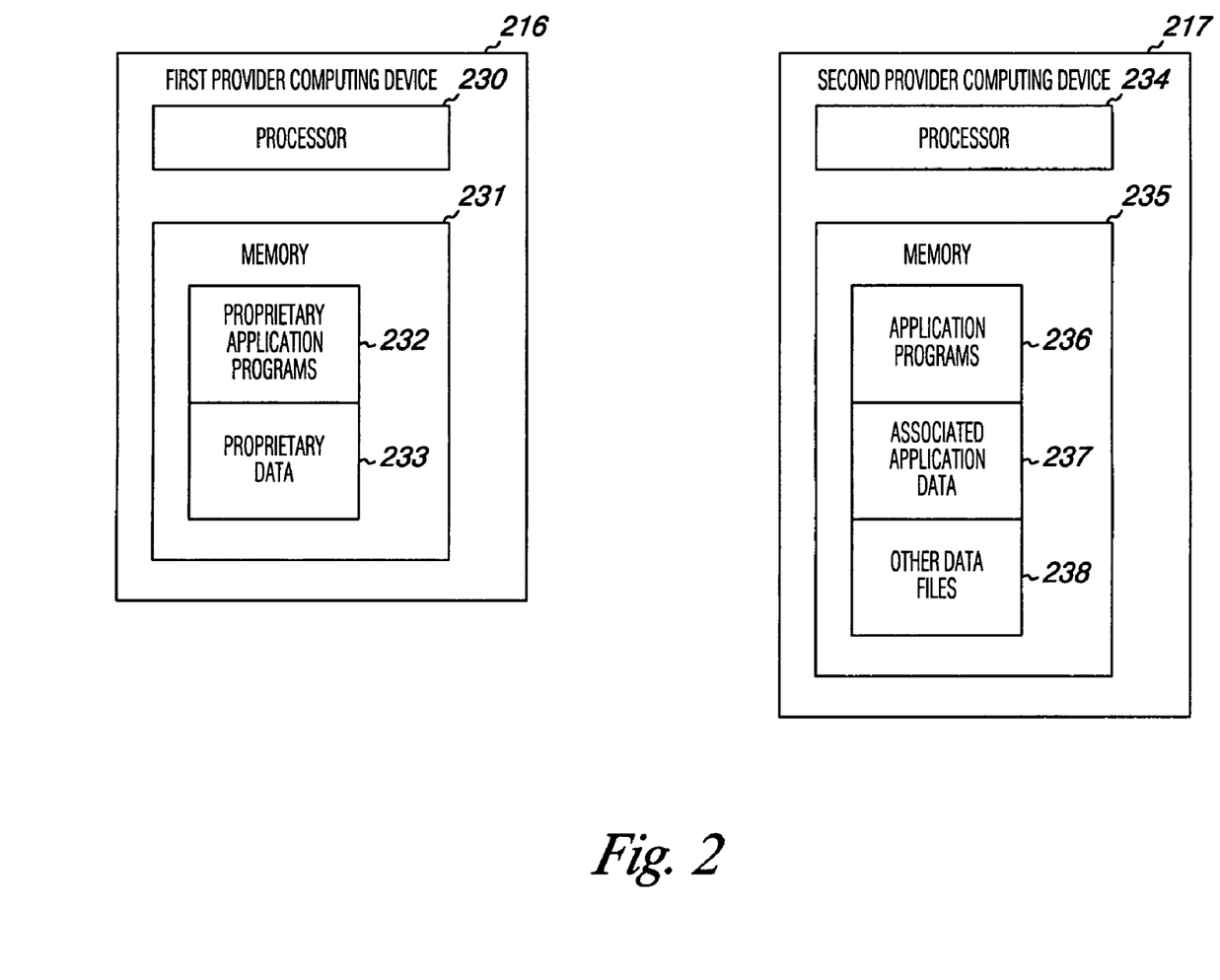
FIG. 2 is an illustration of computing devices of a first and a second provider.

FIG. 2 is an illustration of computing devices of a first and a second provider. The figures herein follow a numbering convention in which the first digit or digits correspond to the drawing figure number and the remaining digits identify an element in the drawing. Similar elements between different figures may be identified by the use of similar digits. For example, 116 may reference element "116" in FIGS. 1A, 1B, and 1C, and a similar element may be referenced as 216 in FIG. 2, and 316 in FIG. 3.

In the embodiment shown in FIG. 2, a first provider's computing device 216 and a second provider's computing device 217 are illustrated. In various embodiments, the first provider's computing device 216 can be communications computing device 116 of FIG. 1A and the second provider's computing device 217 can be communications computing device 117 of FIG. 1A.

The communication devices, servers, and other computing devices discussed herein, such as a server or computing device in a system and/or communications device, include one or more processors and memory therein for the storing and execution of computer executable instructions. Memory can include non-volatile and volatile memory such as Flash memory, Read Only Memory (ROM), Random Access Memory (RAM), etc. Memory can be of various types including magnetic and optical memory types, among others.

In the embodiment shown in FIG. 2, for example, the first provider's computing device 216 includes a processor 230 and memory 231. The memory can include a number of application programs, files, and/or data. In the embodiment shown in FIG. 2, the memory 231 includes a number of provider proprietary application files 232 and proprietary data 233.

As stated above, proprietary data includes data that cannot be transferred and used by another provider without being changed in some manner. For example, if data has to be renamed, reformatted, or manipulated in some other manner, then the data would be considered proprietary.

Proprietary data can also include data that has to be changed in order for it to be understood by another provider, third party application device, and/or entity. For example, a user personal identification number (PIN) could be provided in a particular format used by the first provider. However, the second provider may use a different format, and therefore, the PIN format would have to be changed in order for the second provider to use the PIN.

The proprietary application files 232 use the proprietary data 233 to interact with other components of the communications systems, such as the components of system 100 of FIG. 1A as discussed above. In order for the second provider's computing device to access the data 233 of the first provider's computing device, the second provider's computing device can use computer executable instructions to access the second provider's computing device through a data lookup utility. Since the lookup utility has been developed to work with the first provider's computing device, the lookup utility can access the proprietary files 232 and provide a carrier's view of the proprietary data 232. The carrier's view should be in a standardized, non-proprietary format and, therefore, can be used by other providers, their software, and/or their system components. In some embodiments, the lookup utility can provide the data in a user readable format. For example, the data can be provided in an American standard code for information interchange (ASCII) format.

The data 233 can then be copied and/or extracted from the information retrieved by the lookup utility. For example, if a PIN number is extracted, computer executable instructions can be programmed to reformat the PIN to work with the second provider's computing device. In this way, data that may typically be inaccessible may be accessed by the second provider's computing device.

In some embodiments, the data can then be transferred to the memory 235 of the second provider's computing device. The information can be stored as associated application data 237 and/or in another data file 238. Other data files can include neutral data formats as discussed above, among others.

The data can then be used by the application programs 236 and can be processed by processor 234 to interact with the other components of the communications system, such as the components of system 100 of FIG. 1A.

Data Retrieval and Transfer

Figure 3A:
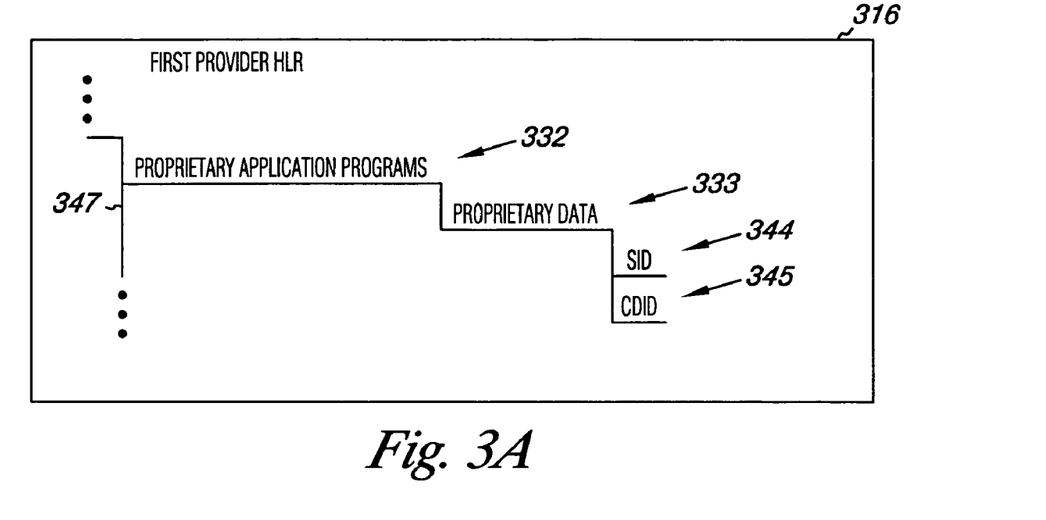
FIG. 3A illustrates an example of a data tree within a first provider's home location register component.

The data retrieval process is discussed in more detail below with respect to FIGS. 3A and 3B. FIG. 3A illustrates an example of a data tree within a first provider's home location register component. The data tree 347 includes a number of proprietary application files 332 and proprietary data 333 including user and/or subscriber identifiers (SIDs) 344 and communications device identifiers (CDIDs) 345.

As stated above, the user related data (e.g., within the proprietary data 333) in the first provider's computing device 316 can include various types of information about the user, such as communications device identification information and billing information (e.g., address, e-mail, telephone number, credit card information, etc.). In some computing devices, the proprietary data can be arranged within the directory or subdirectory of one or more of the proprietary application files, as shown in FIG. 3A.

In some embodiments, the proprietary data can be provided in a data directory that is not within the directory or subdirectory of the proprietary application files. As stated above, the second provider's computing device can use a data lookup utility to retrieve proprietary data 333 from within the first provider's computing device 316. For example, computer executable instructions can execute to query the data lookup utility to find particular data within the first provider's computing device 316. In various embodiments, computer executable instructions can access the first provider's communications computing device by querying the first provider's communications computing device from a second provider's communications computing device to initiate a provisioning stream used by the first carrier.

In some embodiments, computer executable instructions can execute to intercept the communications of the data lookup utility with other components of the communications system. In this way, as information is provided to the various components of the communications system, the information is also provided to the second provider's computing device. Such an embodiment can be beneficial in updating the information on the second provider's computing device as information is updated on the first provider's computing device.

The user's information can be retrieved, in the form of data, by accessing a first provider's communications computing device, having a user's information thereon, through a data lookup utility used by the first provider. This can be accomplished, for example, through use of a provisioning stream used by the first provider and/or used by the first carrier as discussed above.

In some embodiments, accessing the first provider's communications computing device includes accessing the device to obtain data in a user readable format, such as an ASCII format provisioning stream used by the first carrier. By using an ASCII or other text based format, the user information can be retrieved and used in various ways, including placing the information into a database which can then be used as a repository for the user information that can be accessible by the components of the communications system, or provided to various application programs on the communications system. Such a data base can be provided for example, with the associated application data 337 shown in FIG. 3B.

Retrieving the user's information from the first provider's communications computing device can be accomplished by identifying updated user information and retrieving the updated information. For example, in some communications systems, information is updated on a periodic basis (e.g., every second, minute, hour, etc.). The information can also be retrieved in bulk, such as through use of a looping instruction. This can be beneficial for retrieving information from a data table. In such situations, the looping instruction can execute to retrieve a column or row of information at a time until all of the information is retrieved from the table.

In some embodiments, retrieving the user's information can include retrieving a user information file having a list of system keys for all systems accessible by a particular user. System keys are used to provide access by communications devices, such as a wireless phone, to a particular communications system. For example, SIDs and CDIDs can each be used by a different type of communications system to identify a particular user and/or communications device. Retrieval of user information can include retrieving a user information file for each user that includes an association to one of a number of identifiers. For example, all data/files regarding SIDs can be retrieved as a group. The retrieval of this information can be accomplished in a bulk transfer or in multiple smaller transfers.

In this regard, retrieving user information can also include repeatedly accessing a database within the first provider's communications computing device to retrieve information about a number of users by accessing and/or retrieving one user record at a time. Embodiments such as this can be beneficial in retrieving data about a number of users. For example, if the data for a number of users is stored in a database on the first provider's computing device, computer executable instructions on the second provider's computing device can execute in a looping fashion, for example, to repeatedly access the database to retrieve user data. In such embodiments, the information can be retrieved one user at a time.

Retrieving the user's information can include retrieving a mobile directory number and/or information from a number assignment module. A number assignment module can be used to provide a component of the communications system with information for assigning a number to a particular user and/or communications device.

Figure 3B:
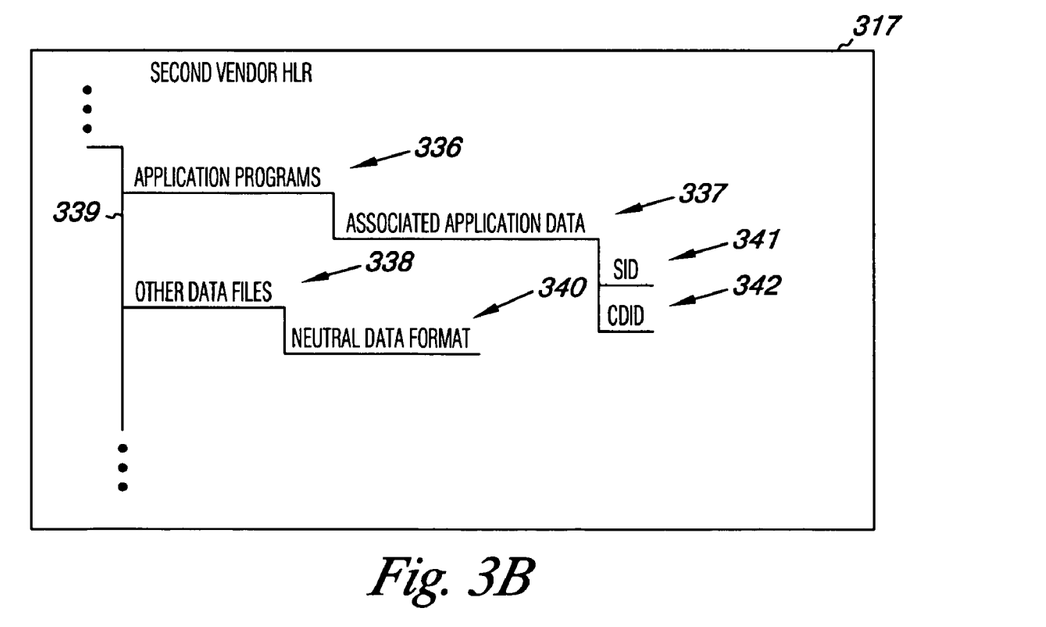
FIG. 3B illustrates an example of a data tree within a second provider's home location register component.

FIG. 3B illustrates an example of a data tree within a second provider's home location register component. In some embodiments, once the proprietary data is retrieved from the first provider's computing device 316, the proprietary data can be transferred to the second provider's computing device for use with the application programs 336 provided thereon. In various embodiments, the retrieved data can also be saved in a data tree 339 within the second provider's computing device 317.

The retrieved data can be stored in the format retrieved, such as within the other data files portion of the data tree 338.

In some embodiments, data can also be stored in a neutral data format 340 (e.g., ASCII) that can be accessible for use by the application programs 336 and/or can be converted to a format usable by the application programs 336. For example, in FIG. 3B, the application programs directory 336 includes an associated application data subdirectory 337 having SID 341 and CDID 342 entries therein. The data stored in these subdirectories can be retrieved from proprietary data storage 333 of the first provider's computing device shown in FIG. 3A, for example.

In some embodiments, data on the second provider's communications computing device to be updated with the retrieved information can be identified through use of computer executable instructions. The identified data on the second provider's communications computing device can then be updated with the retrieved information.

For example, when the information is retrieved from the first provider's computing device, the type of information that has been retrieved can be identified (e.g., through use of computer executable instructions) and used to update related information within the second provider's computing device. For instance, if a SID is retrieved, computer executable instructions can identify it as SID information (e.g., based upon header information and/or the format of the data) and once identified, computer executable instructions can be used to find and/or update the SID information on the second provider's computing device.

In various embodiments, the retrieved information can be mapped to an information and/or data file that is used by a second provider's communications computing device. In this way, the information can be used by a number of components from one location rather than updating duplicate or similar data within each of the number of components. Such files can include neutral data and/or data usable by the application programs 336 of the second provider's computing device 317.

As one of ordinary skill in the art will understand, the embodiments can be performed by software, application modules, and computer executable instructions operable on the systems and devices shown herein or otherwise. The embodiments of the disclosure are not limited to any particular operating environment or to software written in a particular programming language. Software, application modules, and/or computer executable instructions, suitable for carrying out embodiments of the present disclosure, can be resident in one or more devices or locations or in several and even many locations.

Embodiments of the disclosure can also reside on various forms of computer readable mediums. Those of ordinary skill in the art will understand that a computer readable medium can be any medium that contains information that is readable by a computer. Forms of computer readable mediums can, for example, include volatile and/or non-volatile memory stored on fixed or removable mediums, such as hard drives, disks, memory cards, and the like, among others.

Unless explicitly stated, the method embodiments described herein are not constrained to a particular order or sequence. Additionally, some of the described method embodiments or elements thereof can occur or be performed at the same point in time.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for use in a communications system, comprising:
 a processor;
 a memory coupled to the processor; and
 computer executable instructions provided to the memory and executable by the processor to:
  access a communications computing device of a first provider in a first format, the communications computing device being one of a home location register and a home subscriber server and having a user's information stored in the first format thereon, wherein the accessing is performed through a data lookup utility used by the first provider, and the first format is a format the user's information is in when it is stored;
  retrieve the user's information from the communications computing device of the first provider in a second format, wherein the second format is different from the first format and useable by both the communications computing device of the first provider and the communications computing device of a second provider, and the second format is a format the user's information is in when it is stored; and
  transfer the retrieved information to the communications computing device of the second provider, wherein the communications computing device of the second provider is configured to use a format of the user's information different from the first format of the user's information.

2. The device of claim 1, wherein the first provider's data lookup utility is a data extraction utility.

3. The device of claim 1, wherein the first provider's data lookup utility is a provisioning stream.

4. The device of claim 1, wherein the communications computing device of the first provider is configured to maintain a list of home system users.

5. The device of claim 1, wherein the second format is an American standard code for information interchange (ASCII) format.

6. A communications system, comprising:
 a communications computing device of a first provider, the communications computing device being one of a home location register and a home subscriber server and having a number of first provider communications applications and data thereon and wherein the data includes a user's information in a first format, the first format is a format the user's information is in when it is stored; and a communications computing device of a second provider, the communication computing device of the second provider having:

means for accessing the communications computing device of the first provider through a data lookup utility used by the first provider to retrieve the user's information from the communications computing device of the first provider in a second format, wherein the second format is a format the user's information is in when it is stored, and the second format is different from the first format and useable by both of the communications computing devices of the first provider and the second provider, and to transfer the retrieved information to the communications computing device of the second provider, wherein the communications computing device of the second provider is configured to use a format of the user's information different from the first format of the user's information.

7. The system of claim 6, wherein the second format is an American standard code for information interchange (ASCII) format.

8. The system of claim 6, wherein the means for accessing the communications computing device of the first provider include computer executable instructions to retrieve information from a server roaming list.

9. The system of claim 6, wherein the means for accessing the communications computing device of the first include computer executable instructions to retrieve information selected from the group including:
a user name;
a user address;
a user phone number;
a user e-mail address;
a credit card number; and
a credit card expiration date.

10. The system of claim 6, wherein the means for accessing the communications computing device of the first provider include computer executable instructions to retrieve a communications device manufacturer identifier.

11. The system of claim 6, wherein the means for accessing the communications computing device of the first provider include computer executable instructions to retrieve a communications device model identifier.

12. A method for wireless operation between a first system and a second system, comprising:
accessing a communications computing device of a first provider in a first format, the communications computing device being one of a home location register and a home subscriber server and having a user's information stored in the first format thereon, wherein the accessing is performed through a data lookup utility used by the first provider, and the first format is a format the user's information is in when it is stored;
retrieving the user's information from the communications computing device of the first provider in a second format, wherein the second format is different from the first format and useable by both the communications computing device of the first provider and the communications computing device of a second provider, and the second format is a format the user's information is in when it is stored; and
transferring the retrieved information to the communications computing device of the second provider, wherein the communications computing device of the second provider uses a format of the user's information different from the first format of the user's information.

13. The method of claim 12, wherein retrieving the user's information includes retrieving information regarding a number of available features on a user's communications device.

14. The method of claim 12, wherein the method further includes identifying data on the communications computing device of the second provider that should be updated with the retrieved information.

15. The method of claim 12, wherein the second format is an American standard code for information interchange (ASCII) format.

16. The method of claim 14, wherein retrieving the user's information from the communications computing device of the first provider includes identifying updated user information and retrieving the updated information.

17. The method of claim 14, wherein retrieving the user's information from the communications computing device of the first provider includes retrieving information that is periodically updated.

18. A method for wireless operation between a first system and a second system, comprising:
accessing a communications computing device of a first in a first format, the communications computing device being one of a home location register and a home subscriber server and having a user's information stored in the first format thereon, wherein the accessing is performed through a provisioning stream used by the first provider, and the first format is a format the user's information is in when it is stored;
retrieving the user's information from the communications computing device of the first provider in a second format, wherein the second format is different from the first format and useable by both the communications computing device of the first provider and the communications computing device of a second provider, and the second format is a format the user's information is in when it is stored; and
transferring the retrieved information to the communications computing device of the second provider, wherein the communications computing device of the second provider is configured to use a format of the user's information different from the first format of the user's information.

19. The method of claim 18, wherein retrieving the user's information includes retrieving a user information file for each user that includes an association to one of a number of identifiers.

20. The method of claim 18, wherein retrieving the user's information includes retrieving a user information file having a list of system keys for systems accessible by a particular user.

21. The method of claim 18, wherein retrieving the user's information includes repeatedly accessing a database within the communications computing device of the first provider to retrieve information about a number of users by accessing retrieving one user record at a time.

22. The method of claim 18, wherein the second format is an American standard code for information interchange (ASCII) format.

23. The method of claim 18, wherein the method further includes updating an information file that is used by the communications computing device of the second provider based upon the retrieved information.

24. A non-transitory computer readable medium having instructions for causing a device to perform a method, comprising:

accessing a communications computing device of a first provider in a first format, the communications computing device being one of a home location register and a home subscriber server and having a user's information stored in the first format thereon, wherein the accessing is performed through a data lookup utility used by the first provider, and the first format is a format the user's information is in when it is stored;

retrieving the user's information from the communications computing device of the first provider in a second format, wherein the second format is different from the first format and useable by both the communications computing device of the first provider and the communications computing device of a second provider, and the second format is a format the user's information is in when it is stored; and transferring the retrieved information to the communications computing device of the second provider, wherein the communications computing device of the second provider is configured to use a format of the user's information different from the first format of the user's information.

25. The non-transitory computer readable medium of claim 24, wherein the method further includes saving the retrieved information to a neutral data format on the communications computing device of the second.

26. The non-transitory computer readable medium of claim 24, wherein accessing the communications computing device of the first provider includes accessing the device through a provisioning stream used by the communications computing device of the first provider.

27. The non-transitory computer readable medium of claim 24, wherein the second format is an American standard code for information interchange (ASCII) format.

28. The non-transitory computer readable medium of claim 27, wherein accessing the communications computing device of the first provider includes querying the communications computing device of the first provider from the communications computing device of a second provider to initiate provisioning stream used by the communications computing device of the first provider.

29. The non-transitory computer readable medium of claim 24, wherein retrieving the user's information includes retrieving a communications device identifier.

30. The non-transitory computer readable medium of claim 24, wherein retrieving the user's information include retrieving information from a number assignment modules.

* * * * *

UNITED STATES PATENT AND TRADEMARK OFFICE
CERTIFICATE OF CORRECTION

PATENT NO. : 7,853,666 B2  Page 1 of 1
APPLICATION NO. : 11/036080
DATED : December 14, 2010
INVENTOR(S) : Michael R. Kelly et al.

It is certified that error appears in the above-identified patent and that said Letters Patent is hereby corrected as shown below:

In column 11, line 30, in Claim 9, delete "first include" and insert -- first provider include --, therefor.

In column 14, line 2, in Claim 25, delete "second." and insert -- second provider. --, therefor.

Signed and Sealed this
Twenty-seventh Day of December, 2011

David J. Kappos
*Director of the United States Patent and Trademark Office*